AMPLIFYING SYSTEMS

Filed April 29, 1953 2 Sheets-Sheet 1

INVENTOR.
Harold Borkan
BY [signature]
ATTORNEY

AMPLIFYING SYSTEMS

Filed April 29, 1953

INVENTOR.

Harold Borkan

BY Otis A. Mitchell

ATTORNEY 2,714,130

AMPLIFYING SYSTEMS

Harold Borkan, Franklin Township, Somerset County, N. J., assignor to Radio Corporation of America, a corporation of Delaware Application April 29, 1953, Serial No. 351,840

7 Claims. (Cl. 178—5.4)

This invention relates to signalling systems, and more particularly to signalling systems wherein it is desired to amplify in separate channels a plurality of independent signals, which may be derived from a common source, with a minimum of crosstalk between channels and with a high signal-to-noise ratio.

Systems of the above mentioned character are of particular interest in the color television art, as where a single pickup tube is employed to simultaneously derive a plurality of component color image signals. A pickup tube of this type is described in U. S. Patent No. 2,446,249, issued to Alfred C. Schroeder on August 3, 1948. In the tube described therein component color image signals are derived from a plurality of interleaved conducting signal strips, each acting as a signal plate for a respective strip portion of a scanned mosaic charged in accordance with a particular one of the component colors. As employed in a three-color television system, for example, signals representing respectively red, green and blue component colors are derived from three separate output leads respectively connected to spaced ones of the interleaved conducting strips.

A problem of maintaining signal separation often arises in a tube of the type employing interleaved signal strips primarily due to the coupling capacity existing between the respective sets of strips, and secondarily due to leakage between strip sets. Unless some compensating provision is employed in the apparatus coupled to the output leads, crosstalk of an appreciable magnitude between the component color channels may ensue.

Another pickup tube of the type employing interleaved signal strips is the photo-conductive pickup tube described in the co-pending application of Paul K. Weimer, Serial No. 344,497, filed March 25, 1953, and entitled "Cathode Ray Tube and Target." An embodiment of the tube disclosed therein includes a target structure comprising a glass base; a plurality of interleaved red, green and blue pass filter strips deposited thereon and arranged in a predetermined color sequence; a plurality of optically transparent, electrically conductive strips laid down on the filter strips such that a given conductive strip is superimposed upon a given one of the filter strips; a continuous layer of photo-conductive material such as porous antimony sulphide deposited over the conductive strips; and respective "red," "blue" and "green" bus bars connected to the appropriate ones of said conductive strips. As such a target is scanned by a cathode ray beam, each bus bar is supplied its component color signal from the signal strips connected therewith in response to the discharge of those portions of the target which developed image-representative charges as light of the respective component color passed through the optical filter strips associated therewith. A tube of this character may also have high coupling capacities between the sets of signal strips. The capacity between one set of signal strips and another set may be of the order of 500 $\mu\mu$f.

In the co-pending application of Edwin A. Goldberg, Serial No. 348,764, filed April 14, 1953, and entitled "Amplifying Systems," signal amplifying systems are presented for use with tubes of the Schroeder or Weimer type which are intended to substantially eliminate color crosstalk due to the inter-strip capacities while still maintaining a high signal-to-noise ratio. In accordance with an embodiment of the invention disclosed in the Goldberg application, crosstalk between channels due to the interstrip capacities is substantially reduced by employing signal amplifiers which present low input impedance to the signals appearing in the tube output leads. The low input impedance is achieved dynamically by employing negative feedback in each signal amplifying channel. Advantages of this manner of eliminating color crosstalk reside in avoidance of reductions in signal-to-noise ratio which would accompany any attempt to eliminate crosstalk merely by employing a physical impedance of low value in the input circuit of each signal channel. The present invention is directed toward an improvement in the amplifying systems of the type referred to above.

While the provision of an essentially resistive feedback path in each signal amplifier coupled to the output leads of a tube such as Weimer's may provide dynamically an input impedance low enough for de-coupling the color signals, the signal level at the output of this feedback amplifying stage may be so low that a subsequent amplifying stage will mask the signal with the noise of that stage. The present invention proposes using a feedback amplifier in such amplifying systems that has an input impedance which is essentially capacitive over at least a significant portion of the signal frequency range. The ratio of this input impedance to the cross channel coupling impedances may be held substantially constant over this range at a value which results in satisfactory decoupling of the signals. The particular advantage of using this type of dynamic input impedance is that the output signal level for the feedback amplifying stage may be maintained over this significant portion of the signal frequency range at a higher level (substantially above the noise level in a second amplifying stage) than could be obtained using resistive feedback sufficient to obtain an equivalent degree of signal separation at the higher frequency end of this significant portion of the signal frequency range.

In accordance with an embodiment of the invention present the feedback path in the first amplifying stage of each color signal channel is essentially capacitive over the range of signal frequencies where color crosstalk would be the most objectionable. The ratio of the input impedance to the cross-coupling impedance may thus be held, for example, at a ratio of about 1 to 10 over most of this range. By thus employing a frequency determined input impedance, satisfactory separation of the color signals is effected without sacrificing output signal level to a degree which might render noise in the subsequent amplifying stage dominant thereover.

In accordance with this embodiment the feedback amplifier may also be provided with a grid leak resistor effectively shunting the dynamic impedance so as to establish a maximum impedance value which the frequency determined input impedance approaches in the very low frequency range. This is done so that the frequency determined input impedance may still bear an approximate 1 to 10 relationship to the cross-coupling impedance in the very low frequency range, in which range the value of each cross-coupling impedance is essentially equal to the inter-strip leakage resistance. In further accordance with this embodiment, a small resistor may be included in series with the capacitor in the feedback path of each amplifier so as to establish a minimum impedance value which the frequency determined input impedance approaches in the higher frequency ranges.

Accordingly it is a primary object of the present invention to provide an improved system for amplifying in separate channels a plurality of independent signals derived from a common source, with a minimum to cross-talk between channels and with a high signal-to-noise ratio.

It is a further object of the present invention to provide improved means for substantially reducing color crosstalk in a color television system utilizing a color pickup tube of the type employing a plurality of interleaved signal strips.

It is another object of the present invention to provide an improved camera preamplifier for a color pickup tube wherein color crosstalk is substantially lessened and a satisfactory signal-to-noise ratio is maintained over the entire signal frequency range.

It is a further object of the present invention to provide a color television system with a camera preamplifier having a frequency determined input impedance.

It is another object of the present invention to provide an improved preamplifier for a tri-color camera tube wherein color crosstalk is substantially reduced, a high signal-to-noise ratio is maintained, and output signal level for signals over a wide band of video frequencies is at a satisfactorily high value.

Other objects and advantages of the present invention will be apparent to those skilled in the art after a reading of the following detailed description and an inspection of the accompanying drawings in which.

Figures 1, 2:
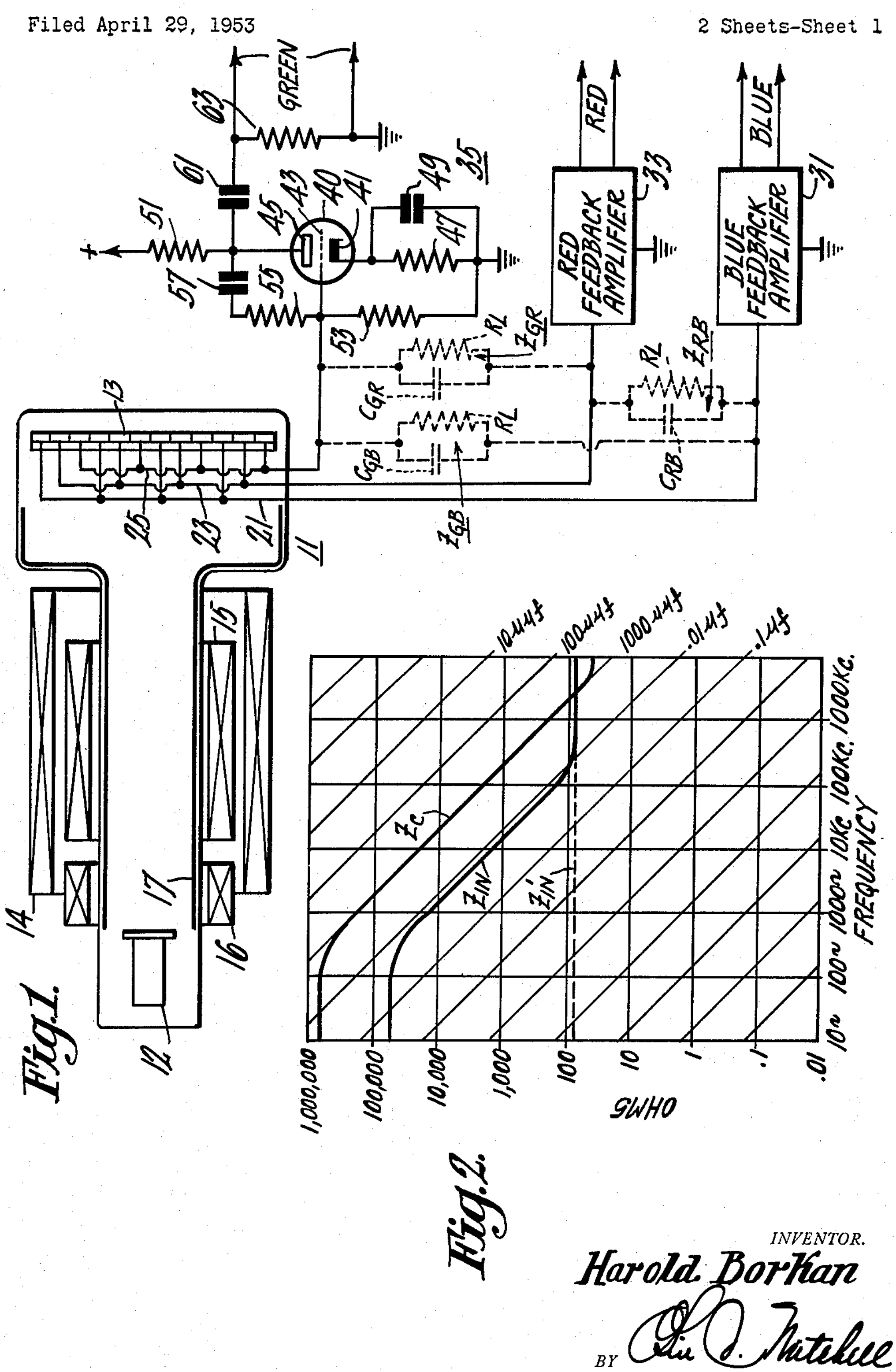
Figure 1 illustrates in block and schematic form a color pickup tube system incorporating a preamplifier in accordance with the present invention.
Figure 2 illustrates graphically the relationship between the input impedance of a component color signal channel and the effective impedance of the related "crosstalk" signal paths in the pickup tube system of Figure 1.

In Figure 1 a pickup tube 11 of the type disclosed in the aforementioned Weimer application is illustrated schematically. The tube is provided with a conventional electron gun 12 which may include the usual cathode, control electrode and one or more accelerating electrodes which are connected to operating potentials in a well known manner. A target of the previously mentioned character is illustrated as target 13 at the opposite end of the tube 11. Means are provided for focusing the electron beam developed by electron gun 12, and for scanning the beam over target 13 to develop a conventional scanning raster. These means may include focusing coil 14 and deflection yoke 15; an alignment coil 16 may additionally be provided. An electrode (not shown) permeable to the electron beam may be positioned adjacent to the target 13 and utilized together with focus coil 14 to ensure that the beam in its final approach to the surface of target 13 is normal thereto. A final accelerating electrode 17 may be in the form of a conducting coating on the interior of the envelope of the tube 11.

While the target 13 has not been illustrated in full detail, it will be appreciated from the previous description above that the output leads 21, 23 and 25, which may take the form of bus bars incorporated in the target structure, are supplied with the respective blue, red and green component color signals derived from the appropriate conductive strips in the target structure 13. As illustrated, the respective output leads 21, 23 and 25 are coupled to separate color channels which include, respectively, a blue feedback amplifier 31, a red feedback amplifier 33 and a green feedback amplifier 35. Since in accordance with the invention the three amplifiers may be substantially identical, only the circuit details of the green amplifier 35 have been shown, while the blue and red amplifiers 31 and 33 have been shown in block form. An explanation of the operation of the present invention necessitates a preliminary analysis of the difficulties which are presented when using a tube of this type. Due to the nature of the signal deriving means for each channel, which as noted comprises a plurality of spaced signal strips interleaved with the signal strips of the other channels, there is a significantly high coupling capacity between each set of conducting strips and the other two sets of conducting strips. These inherent capacities have been illustrated in dotted lines as capacitors $C_{gb}$, $C_{gr}$ and $C_{rb}$. In a typical tube of the type disclosed in the aforementioned Weimer application the coupling capacity from one set of strips to another set may be of the order of 500 $\mu\mu$f.

Of secondary importance with respect to the causation of color crosstalk is the existence of inherent leakage resistances between the sets of signal strips. In a typical tube of the aforementioned Weimer type these leakage resistances may be in a range from 10,000 ohms to 1 megohm. In Figure 1, these leakage resistances have been illustrated in dotted lines as resistors $R_L$ shunting the respective inter-strip capacities. The complex inter-strip coupling impedances comprising the shunt resistance and capacity components have been designated respectively $Z_{gb}$, $Z_{gr}$ and $Z_{rb}$.

If camera preamplifiers of the type conventionally employed in monochrome pickup tube systems were coupled to the output leads of tube 11, the input impedance of each such amplifier would be so high relative to the interstrip coupling impedances that a considerable portion of each component color signal would appear in the other color channels. This color crosstalk would render the separation of component color signals from the target substantially ineffective. To reduce this color crosstalk to a permissible value the preamplifiers coupled to the tubes output leads should have a significantly low input impedance compared with the channel coupling impedances presented by the interstrip capacities and leakage resistances.

Although a low input impedance could be achieved by simply employing a low valued physical impedance in the input circuit of each channel amplifier, reduction of the signal-to-noise ratio to a relatively unuseable level would accompany such an operation. To more fully appreciate the reasons underlying such a resultant reduction of signal-to-noise ratio, consideration should be taken of the various factors which determine noise generation in systems of the general character under discussion.

In a simple camera preamplifier in which the signal current of the pickup tube flowing through an input resistor produces a potential drop which is applied to grid of the tube in a first amplifying stage, the noise current originating in the first amplifying stage consists of two significant components: thermal-agitation noise, or so-called Johnson noise, developed in the physical input impedance (the input resistor); and current fluctuations developed in the plate circuit of the tube (i. e. tube noise, such as "shot" noise). A total equivalent input noise current, summing the equivalent input noise currents representative of these two significant components, may be derived and expressed as a root-mean-square noise current, $In$, for an amplifier having a pass band of 0 to $f_m$, as follows:

$$In=\sqrt{4kTf_m\left(\frac{1}{R}+\frac{R_t}{R^2}+\frac{R_t(\omega_m C)^2}{3}\right)}$$

where R is the physical input resistance, $R_t$ the equivalent noise resistance of the tube, C the total input capacitance, T the temperature in degrees Kelvin, and $k$ the Boltzmann constant.

It may readily be demonstrated that if one employs an input resistor having a resistance low enough to effect substantial crosstalk reduction in a tube such as Weimer's, the $$\left(\frac{1}{R}\right) \text{ and } \left(\frac{R_t}{R^2}\right)$$

terms, which respectively represent the Johnson noise component, and a portion of the tube noise component, become so appreciable relative to the signal current (which, in tubes of this type, is derived from what is essentially a constant current source) that the signal-to-noise ratio of the amplifying stage output is impractically low.

Thus, to provide the preamplifier with the low input impedance requisite for adequate color separation while still obtaining an output from the first amplifying stage having a satisfactory signal-to-noise ratio, Goldberg in his aforementioned copending application employs negative feedback from the output electrode of the first amplifying stage to its input electrode so as to effect a low input impedance dynamically. By introducing the low input impedance in this manner, the physical input re-resistor R may be quite large so that the aforementioned $$\left(\frac{1}{R}\right) \text{ and } \left(\frac{R_t}{R^2}\right)$$

terms will be negligible, and a high signal-to-noise ratio may be obtained. In addition the negative feedback system enjoys the advantage that for a substantial portion of the noise generated in one channel and appearing in the output thereof with a given polarity, an equivalent amount of noise will appear in the outputs of the other channels with the opposite polarity. As a result a significant portion of such noise may effectively cancel itself out in a subsequent color reproduction of the image received by the pickup tube.

However, as an improvement in the aforementioned system, in the interest of maintaining the output signal level of the first amplifying stage as high above the level of the noise associated with a subsequent amplifying or other signal utilization stage as is compatible with satisfactory color crosstalk elimination, the present invention proposes that the dynamically effected input impedance be frequency determined. To appreciate the advantages of this improvement, the details of the representative green amplifier 35 will now be considered.

The green amplifier 35 includes an amplifying stage incorporating an electron discharge device 40 which may, as illustrated, be a triode having a cathode 41, control grid 43 and a plate 45. The cathode 41 is connected to a point of reference potential (i. e. ground in the illustrated embodiment) via a cathode resistor 47 shunted by by-pass capacitor 49. Plate 45 is connected to a source of anode potential (not illustrated) via the plate resistor 51. A coupling capacitor 61 and a load resistor 63 connected in series between the plate 45 and ground complete an output circuit for the amplifying stage. The green output signal is developed across the output resistor 63 and may be applied to subsequent signal utilization apparatus in the green channel which may, for example, include subsequent signal amplifying stages. It may be assumed that the red amplifier 33 and the blue amplifier 31 are substantially identical with the detailed showing of the green amplifier 35.

A capacitive feedback path is established between the output electrode and input electrode of the amplifying stage. This is done by including capacitor 57 in a circuit connected between the plate 45 and grid 43 of the amplifying tube 40. The value of the capacitor 57 is chosen in relation to the value of the inter-strip coupling capacities ($C_{gb}$, etc.) so that the effective input impedance of the amplifying stage 35 is a desired fraction of the value of the inter-strip coupling impedances over at least a significant portion of the video signal frequency range. As an example, the value of the feedback capacitor 57 may be chosen so that the effective input impedance $Z_{in}$ of the green amplifier stage 35 bears approximately a 1:10 relationship to the impedance ($Z_C$) presented by the strip coupling impedances, $Z_{GB}$ and $Z_{GR}$, to the input of amplifier 35 ($Z_C$ being essentially the parallel combination of $Z_{GB}$ and $Z_{GR}$ under these conditions).

The proper value of feedback capacitor 57 may be approximately determined by the expression:

$$C_{57}=\frac{C_{GB}+C_{GR}}{x\mu}$$

where $x$ is the desired ratio of $$\frac{Z_{IN}}{Z_C}$$

and $\mu$ is the forward gain of the amplifying stage. It may be readily appreciated that while the embodiment of the invention illustrated in Figure 1 employs single stage feedback loops, the principles of the invention are also applicable where a multi-stage feedback loop is employed (in which case the $\mu$ in the above expression would be the total forward gain of the multi-stage arrangement).

As has been noted before, the inter-strip coupling impedances are not solely capacitive, but rather include a leakage resistance component which is effectively in shunt with the coupling capacity component. At very low signal frequencies the inter-strip coupling impedances will approach the value of these leakage resistances. Thus, if it is desired to substantially maintain the 1 to 10 ratio of $Z_{in}$ to $Z_c$ in the range of very low signal frequencies, a grid leak resistor 53 of appropriate size may be connected between the grid 43 and ground. This grid leak resistor 53, which may in an illustrative example be of the order of 50,000 ohms, is effectively in shunt with the dynamic input impedance and establishes a maximum value which the input impedance approaches in the range of very low signal frequencies.

In cases where the leakage resistance value is low, a low valued grid leak resistor would be called for to obtain the above effect, but its use would be precluded in view of the accompanying increase in equivalent input noise current, $I_n$, as explained previously. Thus, as an alternative in these cases, an appropriately valued resistor may be shunted across capacitor 57 in the feedback loop to obtain the desired ratio in the very low frequency range. A blocking capacitor would then be additionally required in the feedback path to prevent plate voltage from appearing at grid 43.

While it might be desirable for satisfactory component signal separation to maintain the 1 to 10 ratio of $Z_{in}$ to $Z_C$ throughout the entire signal frequency range, it is generally not feasible to continue this relationship throughout the higher signal frequency ranges (say above 1 mc.), a practical reason precluding this continuance being that the output signal level may as a result be so low as to be substantially masked by the noise in a subsequent amplifying or other utilization stage. For this reason a low value feedback resistor 55 is preferably included in the negative feedback path in series with the capacitor 57 between plate 45 and grid 43. The small feedback resistor 55 establishes a minimum value which the input impedance of the amplifying stage aproaches in the higher frequency bands of video signals.

The effect of feedback capacitor 57, feedback resistor 55 and grid leak resistor 53 upon the effective input impedance of the amplifying stage may be better understood through the aid of Figure 2 in which the effective input impedance, as well as the cross-coupling impedances as seen by the amplifier input, are plotted against frequency. Inspecting the plot labeled $Z_{in}$, it is seen that the effective input impedance of the amplifying stage is essentially resistive over a range of very low signal frequencies at a value essentially determined by the grid leak resistor 53. Over the succeeding range of frequencies (for example from 100 cycles to about 100 kc.) the effective input impedance is essentially capacitive dropping with frequency as the reactance of feedback capacitor 57 decreases. For higher frequencies the effective input impedance approaches a minimum value determined by the series feedback resistor 55, the input impedance being essentially resistive and constant at this minimum value above the frequency of 1 mc., for example.

The plot labeled $Z_c$ may be the effective impedance from the green signal strip set to ground (due to the inherent inter-strip couplings) as seen by the green amplifier's input circuit. In the very low signal frequency range it may be noted that $Z_c$ is also essentially resistive as determined by the value of leakage resistance between strips. For frequencies higher than this range the impedance $Z_c$ becomes essentially capacitive, dropping linearly as the signal frequency increases. It is noted however that in the very high signal frequency range the plot of $Z_c$ approaches a constant value, this minimum being substantially equal to one half the minimum value which the plot of $Z_{in}$ approached. This effect is due to the fact that $Z_c$ as seen by the input of green amplifier 35 comprises the parallel combination of: $Z_{GB}$ in series with the input impedance of the blue amplifier 31, $Z_{GR}$ in series with input impedance of the red amplifier 33. Since the blue amplifier 31 and the red amplifier 33 may be substantially identical to the green amplifier 35, the input impedance of each of these amplifiers approaches the same minimum value as does $Z_{in}$ for the green amplifier. Thus, in this high frequency range, $Z_c$ is essentially determined by the impedance of the parallel combination of the input impedances of the red and blue amplifiers, and therefore is approximately equal to $$\frac{Z_{in}}{2}$$

The advantages of the present invention over the use of simple resistive feedback are readily apparent from the plots shown in Figure 2. By virtue of the employment of capacitive feedback, preferably supplemented by the auxiliary use of an appropriately valued grid leak resistor (or shunt resistance across the feedback capacitor), the effective input impedance of the first amplifying stage in each channel is maintained in a desired ratio to the inter-strip coupling impedances over a substantial (lower frequency) portion of the video signal range. As an example, if this ratio, as suggested above, is 1 to 10, a satisfactory 90% separation of component color signals may be effected over this range. Since color crosstalk may be more readily tolerated in the higher video signal frequency ranges, satisfactory color image reproduction may take place even though this degree of separation is not maintained in the higher frequency ranges.

A particular advantage of the present invention over the use of simple resistaive feedback is that satisfactory color signal separation may be achieved over a desired wide range of frequencies without sacrificing output signal level of the first amplifying stage to an unnecessary extent. This advantage may be more fully appreciated by comparing the plot $Z_{in}$ in Figure 2 with the plot of $Z'_{in}$, which represents the effective input impedance of amplifier 35 when resistive feedback is employed to obtain satisfactory signal separation over a comparable range of signal frequencies. Another advantage resides in the fact that the percentage of color crosstalk existing throughout the effective separation range is substantially constant at a known value. Of course it must be recognized that use of a frequency determined input impedance as proposed by the present invention may necessitate some form of peaking in subsequent stages of each channel to obtain a flat frequency response. This may readily be achieved in accordance with well known peaking principles.

Figure 3:
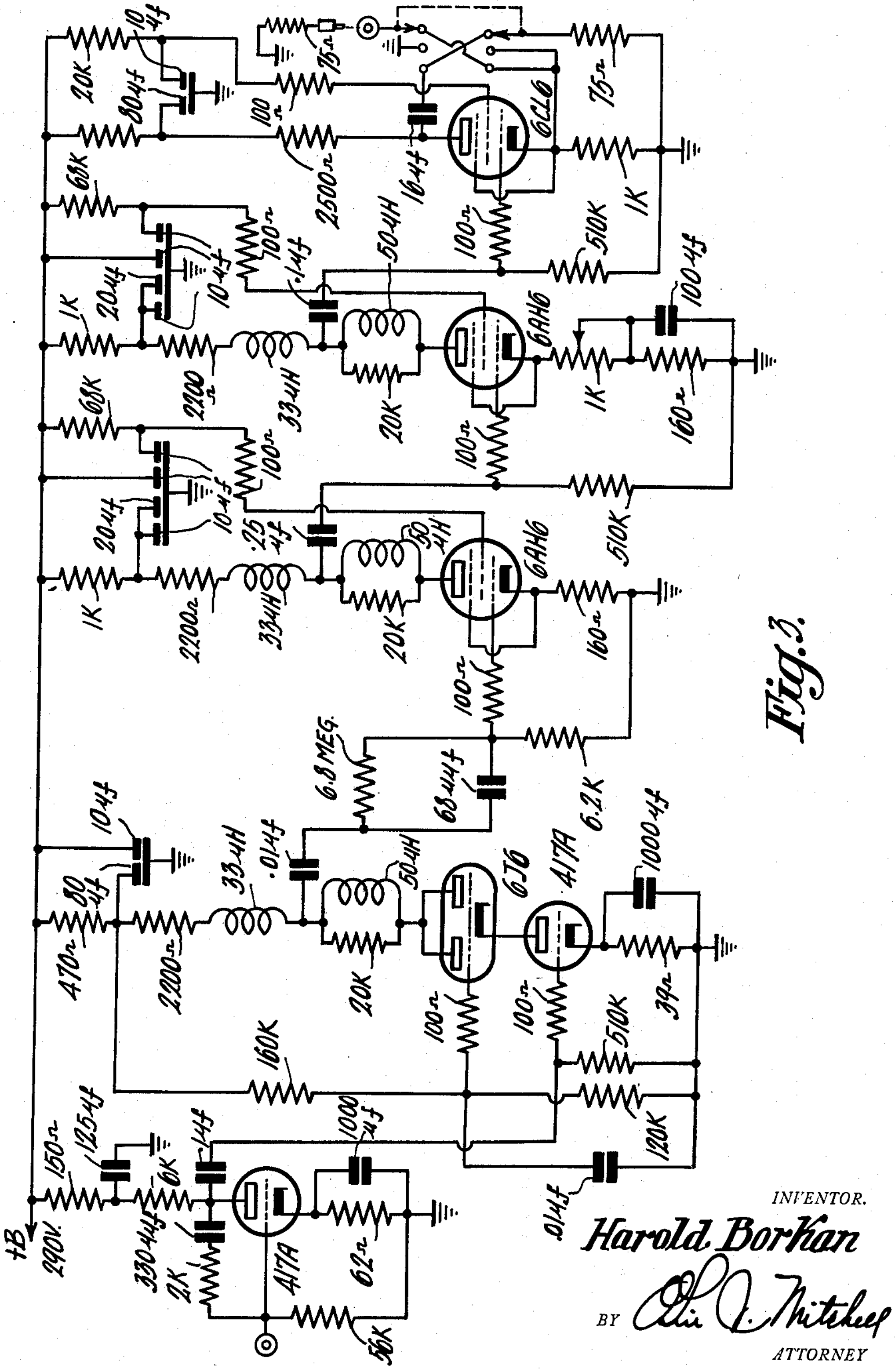
Figure 3 illustrates schematically a specific example of a component color signal channel amplifier embodying the principles of the present invention.

In Figure 3, a practical example of one channel of a camera preamplifier which embodies the present invention is given. The first amplifying stage provides a frequency determined input impedance dynamically through the use of capacitive feedback as explained previously. By virtue of the use of a frequency determined input impedance a satisfactorily low percentage of crosstalk is obtained for signal frequencies of 1 mc. and lower, while output signal level is kept satisfactorily high relative to the noise level in the second amplifying stage. As may be noted in Figure 3, the coupling between the second and third amplifying stages includes a peaking circuit designed to compensate for the amplitude distortion introduced through the use of the frequency determined input impedance. While specific circuit details and specific values of resistances, capacitances, voltage, etc. are presented in Figure 3, it will be appreciated that these are given by way of example only.

What is claimed is:

1. In a color television system including a cathode ray tube comprising a plurality of sets of signal strips for deriving respective component color signals, cross-coupling impedances existing between said signal strip sets, said impedances being essentially capacitive over a given range of signal frequencies, a signal amplifying system comprising the combination of a plurality of signal amplifying means, each of said signal amplifying means being coupled to a respective one of said signal strip sets, means for establishing a negative feedback path in each of said signal amplifying means, each of said negative feedback paths being essentially capacitive over said given range of signal frequencies so that the effective input impedance of each of said signal amplifying means bears a predetermined ratio to said cross-coupling impedances over said given range.

2. In a color television system, apparatus comprising the combination of a camera tube having a plurality of related means for deriving respective component color signals from a common current source, said common current source comprising a scanning cathode ray beam, and each of said related deriving means including a set of mutually connected signal strips interleaved with the signal strips of the other signal deriving means, a plurality of signal amplifiers, each of said signal amplifiers being coupled to a respective one of said signal deriving means, and means for reducing crosstalk between said signal deriving means comprising a feedback loop in each of said signal amplifiers for dynamically lowering the effective input impedance of each of said signal amplifiers, each of said feedback loops including a capacity for rendering said dynamic reduction of input impedance inversely proportional to frequency over a predetermined range of signal frequencies.

3. In a color television system, apparatus comprising the combination of a tri-color camera tube including three sets of interleaved signal strips for developing three respective component color signals, each of said signal strip sets being inherently coupled to each of the other signal strip sets by an impedance which is essentially capacitive over a given range of signal frequencies, three component color signal channels, each of said signal channels including a signal amplifier having an input and an output circuit, means for coupling the input circuit of each of said signal amplifiers to a respectively different one of said sets of signal strips, means for establishing a negative feedback path between the output circuit and input circuit of each of said signal amplifiers, each of said negative feedback paths including a capacitor, the capacitance of each said capacitor being approximately equal to $$\frac{C}{x\mu}$$

where C is equal to the capacitance of a pair of said coupling impedances in parallel, $\mu$ is the forward gain of the associated signal amplifier, and $x$ is a fraction representative of a percentage of crosstalk between signal channels which may be tolerated over said given range.

4. In a color television system, apparatus comprising the combination of a tri-color camera tube including three sets of interleaved signal strips for developing three respective component color signals, inherent coupling impedances existing between each signal strip set and the other signal strip sets, three component color signal channels, each of said signal channels including at least one amplifying stage having an output circuit and an input circuit, means for coupling the input circuit of each of said signal amplifying stages to a respectively different one of said sets of signal strips, means for establishing a negative feedback path between the output circuit and the input circuit of each of said amplifying stages, each of said negative feedback paths including a capacitor and a resistor in series, the values of each said resistor and capacitor being related in such a manner that the effective input impedance of each said signal amplifier is essentially capacitive over a first range of signal frequencies and essentially resistive over a second higher range of signal frequencies.

5. Apparatus in accordance with claim 4 wherein the effective input impedance of each of said signal amplifier throughout said first range of signal frequencies is substantially a predetermined fraction of the impedance presented by said inherent coupling impedances to the input circuit of each said signal amplifier.

6. In a color television system, apparatus comprising the combination of a tri-color camera tube including three sets of interleaved signal strips for developing three respective component color signals, said signal strip sets being inherently coupled by impedances which are essentially capacitive over a given range of signal frequencies, three component color signal channels, each of said signal channels including at least one amplifying stage having an output circuit and an input circuit including an input resistor, means for coupling the input circuit of each of said signal amplifying stages to a respectively different one of said signal strips, means for establishing a negative feedback path between the output circuit and the input circuit of each of said amplifying stages, each of said negative feedback paths including a feedback capacitor and a feedback resistor in series, the values of each said feedback resistor, feedback capacitor and input resistor being related in such a manner that the effective input impedance of each said signal amplifier is essentially resistive over a range of signal frequencies below said given range, essentially capacitive over a first portion of said given range, and essentially resistive over the remaining portion of said given range.

7. Apparatus in accordance with claim 6 wherein the effective input impedance of each said signal amplifier throughout said first portion of said given range and throughout the frequency range below said given range is substantially a predetermined fraction of said coupling impedances.

References Cited in the file of this patent

UNITED STATES PATENTS 2,615,976 Rose ------------------ Oct. 28, 1952